No. 618,346. Patented Jan. 24, 1899.
G. HARROUFF.
COMBINED STOCK AND FEED RACK FOR WAGONS.
(Application filed Sept. 2, 1898.)
(No Model.) 2 Sheets—Sheet 1.

Witnesses:
M. R. Remley.
S. Kernahan

Inventor:
Geo. Harrouff
By Higdon, Fischer & Thorpe
Attys.

THE NORRIS PETERS CO., PHOTO-LITHO., WASHINGTON, D. C.

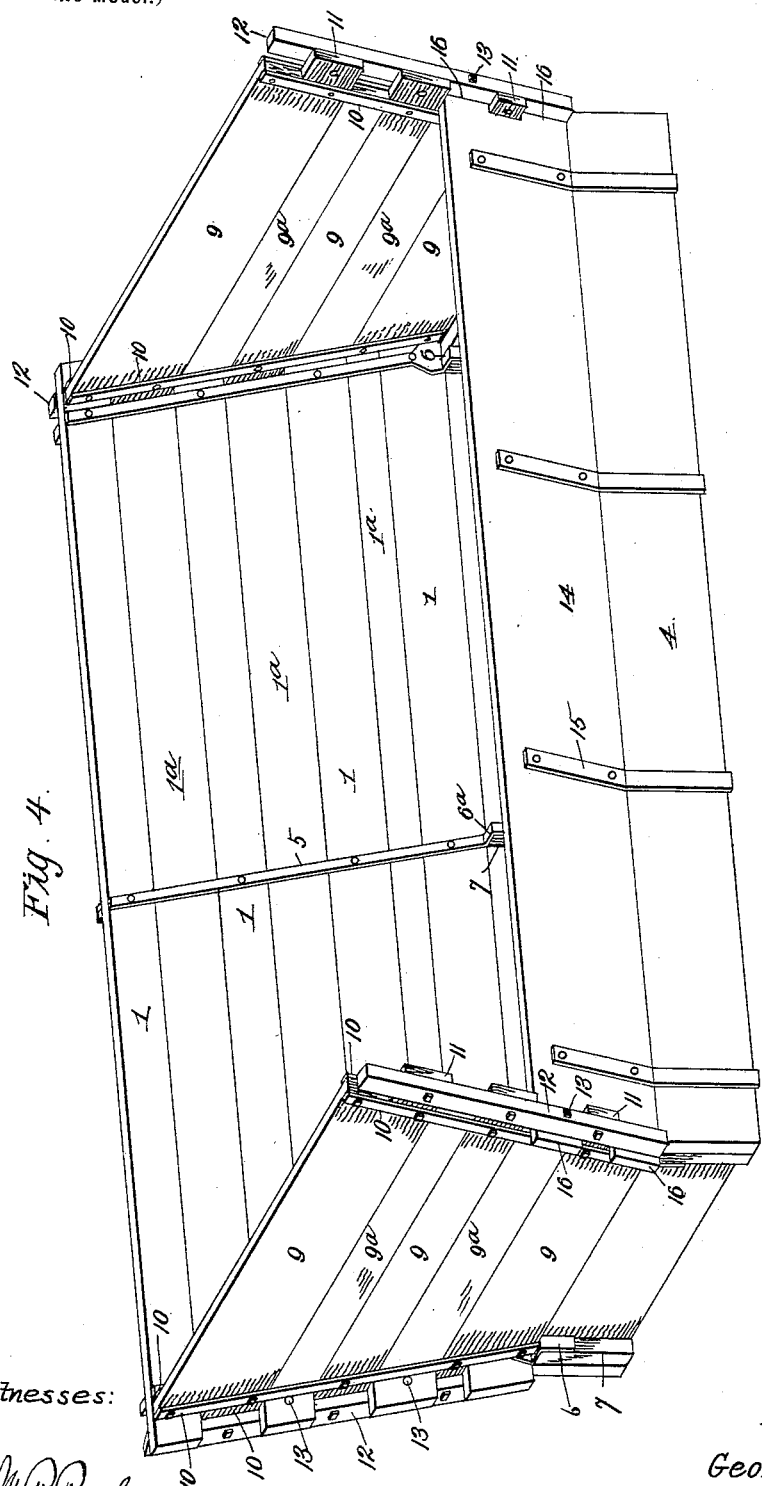

UNITED STATES PATENT OFFICE.

GEORGE HARROUFF, OF McPHERSON, KANSAS.

COMBINED STOCK AND FEED RACK FOR WAGONS.

SPECIFICATION forming part of Letters Patent No. 618,346, dated January 24, 1899.

Application filed September 2, 1898. Serial No. 690,127. (No model.)

*To all whom it may concern:*

Be it known that I, GEORGE HARROUFF, a citizen of the United States, residing at McPherson, in the county of McPherson and State of Kansas, have invented certain new and useful Improvements in a Combined Stock and Feed Rack for Wagons, of which the following is a specification.

My invention relates to stock and feed racks; and it consists in certain novel and peculiar features of construction and combinations of parts, as will be hereinafter described and claimed.

The object of the invention is to produce a portable stock and feed rack of knockdown and inexpensive construction which can be easily and quickly transferred from one style of rack to the other.

Other objects of the invention will hereinafter appear.

In order that the invention may be fully understood, I will proceed to describe it with reference to the accompanying drawings, in which—

Figure 1:
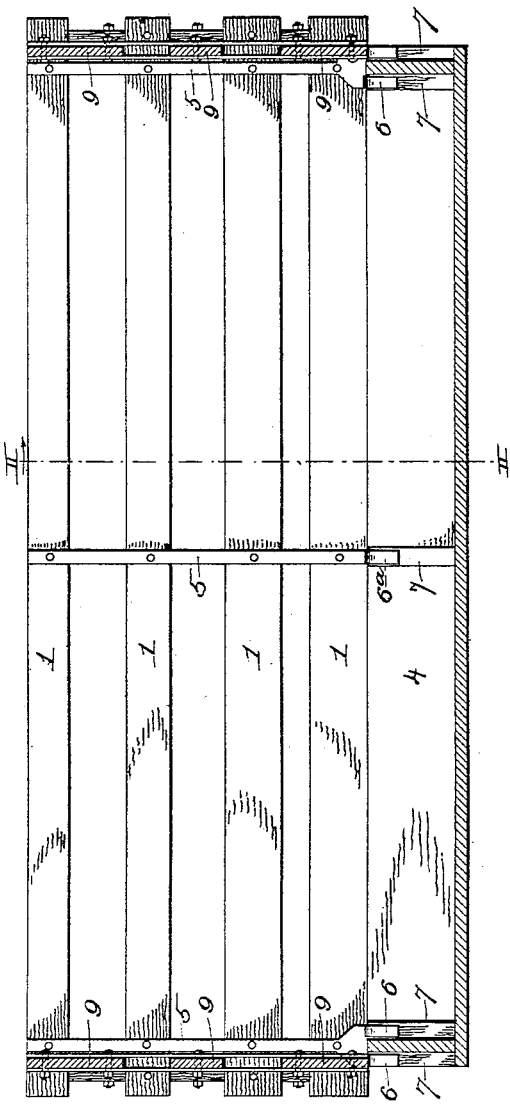
Figure 3:
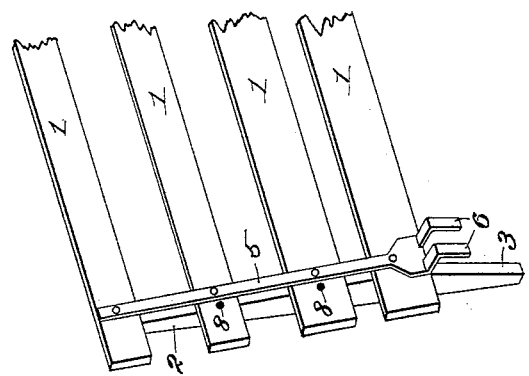
Figure 2:
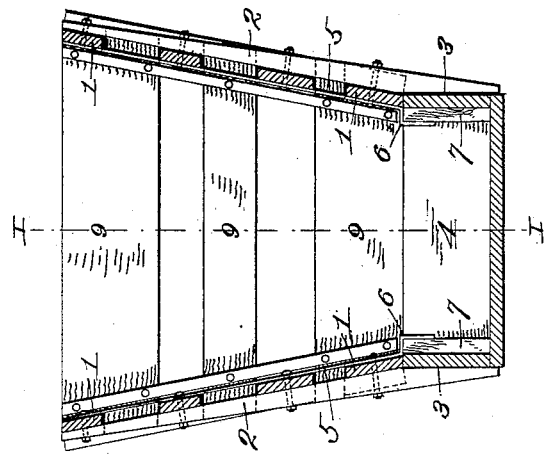

Figure 1 represents a vertical longitudinal section of the device. Fig. 2 is a cross-section taken on the line II II of Fig. 1. Fig. 3 is a perspective view of part of the device. Fig. 4 is a perspective view showing the device arranged as a feed-rack, with one low side to facilitate loading.

The rack comprises, essentially, four parts—viz., two sides and two ends. The former consists of a series of parallel longitudinal bars 1, arranged at suitable distances apart and bolted or otherwise secured to the vertical bars 2, and the latter, below bars 1, are beveled, as shown at 3, in order that when the sides are placed upon the side bars of a wagon-box, as at 4, with the undermost bars 4 resting thereon, the beveled surfaces 3 will fit squarely against the outer surfaces of the side walls, and thereby support the sides in the inclined position shown most clearly in Figs. 2 and 4. This arrangement insures greater carrying capacity to the wagon than if the side walls extended vertically. The longitudinal bars are also connected at their inner sides by the bars 5, there being preferably three of them. The endmost ones are enlarged at their lower ends and provided with bifurcated hook portions 6, which straddle the end walls of the wagon-box and rest upon the vertical cleats 7, secured to the inner side of the side walls of the box, this arrangement preventing the rack from working or sliding endwise upon the wagon-box. The inner bars 5 are preferably provided with hooks $6^a$ at their lower ends, embracing and bearing upon the cleats 7.

Outward of the endmost bars 5 one or more of the rails 1 are provided with holes or openings 8, for a purpose which will hereinafter appear.

The end walls of the device consist of a series of parallel cross-bars 9, bolted between strips 10 and of such configuration as to fit snugly down between the flaring side walls and upon the end walls of the wagon-box.

The top and bottom bars 9 of the end walls are reduced in width in order to project in the form of tongues 11 through the slots or openings of the side walls, below and above, respectively, the top and bottom rails of the same. The central bars 9 also project through openings formed between certain rails of the side walls, and bolted to the projecting ends of bars 9 at the outer sides of the side walls are the bars 12, which thus form a brace or support to prevent the side walls being pushed outward under any weight or load upon the wagon. When the bars are thus arranged, the bolts 13 are fitted through the openings 8, hereinbefore referred to, and through said bars 12 to prevent the end walls by any possibility being pushed farther apart, and thereby slipped off the ends of the side walls. It will thus be seen that these bolts 13 are necessary to provide a firm and rigid structure and that the removal of these bolts permits the rack to be quickly and easily removed section by section.

When arranged as above described, the device is for use in conveying stock. When it is to be used for conveying feed, bars $1^a$ and $9^a$, respectively, are slipped in between the rails 1 and 9, so as to close the openings or spaces in the sides and end walls and to provide a closed rack whereby small grain may be transported without loss.

In order to facilitate the introduction of grain into the rack, I preferably leave one side wall off and substitute therefor a half side wall 14, which is fitted down upon the corresponding side of the wagon-box and is provided with depending brackets 15 to assist in holding it in operative position. It is also slotted at its ends to provide a pair of tongues 16, which project outwardly through the openings formed between the bottom end rail and the rail immediately above and below the tongue 11 of said rail. It also projects through the slot formed between the bars 10 and adjacent bars 12, and at least one of the bolts 13 of the latter is fitted through said side wall, as clearly shown in Fig. 4. By this arrangement it is obvious that grain can be shoveled or otherwise discharged into the rack with ease and despatch, owing to the fact that it has to be elevated only sufficiently to clear the half side wall 14. Owing to this fact it is obvious that it may be shoveled in from the ground quickly and without the exercise of particular care, because if it is shoveled carelessly and strikes the opposite side wall it falls back into the wagon.

From the above description it will be apparent that I have produced a combined feed and stock rack which embodies the features of advantage enumerated in the statement of invention and which may be varied in detail construction or proportion without departing from the spirit and scope of the invention.

Having thus described the invention, what I claim as new, and desire to secure by Letters Patent, is—

1. A combined feed and stock rack, consisting of side walls composed of longitudinal rails and cross-bars connecting the same, and end walls consisting of cross-rails arranged with spaces between them, bars 10 connecting the same, and bars 12 connecting the extreme ends of rails 9, so as to form a slot intersecting the spaces between rails 9, through which project the ends of the rails of the side walls, and bolts extending through bars 12 and certain rails of the side walls, substantially as described.

2. A combined feed and stock rack, consisting of side walls composed of longitudinal rails, cross-bars connecting the same, and bars connecting the rails at their inner sides and provided with bifurcated hooks at their lower ends to rest upon a wagon-box and embrace the end walls thereof, end walls consisting of cross-rails arranged with spaces between them, bars 10 connecting the same, bars 12 connecting the extreme ends of rails 9, so as to form a slot intersecting the spaces between rails 9, through which project the ends of the rails of the side walls, and bolts extending through bars 12 and certain rails of the side walls, substantially as described.

3. The combination of a wagon-box, end walls of a feed or stock rack resting thereon and provided with slots, a side wall composed of a plurality of longitudinal bars projecting through certain of the slots of the end walls and secured upon the wagon and to said end walls, and a half side wall secured upon the opposite side of the wagon-box and provided with tongues projecting through the remaining slots of the end walls, and bolts extending through said half side walls and parts of the end walls, substantially as and for the purpose described.

In testimony whereof I affix my signature in the presence of two witnesses.

GEORGE HARROUFF.

Witnesses:
RICHARD MILLER,
JOHN R. WRIGHT.